3,428,579
EXPANDABLE FINELY DIVIDED PLASTICS COMPOSITIONS
Erhard Stahnecker, Ziegelhausen, and Johannes Grohmann, Ludwigshafen (Rhine), Germany, assignors to Badische Anilin- & Soda-Fabrik Aktiengesellschaft, Ludwigshafen (Rhine), Germany
No Drawing. Filed Mar. 29, 1965, Ser. No. 443,619
Claims priority, application Germany, Apr. 1, 1964, B 76,141
U.S. Cl. 260—2.5                9 Claims
Int. Cl. C08f 47/08

ABSTRACT OF THE DISCLOSURE

Expandable styrene polymer particles containing an expanding agent and obtained by coating with very small amounts of aqueous polymer dispersions and evaporating the water. The particles do not agglomerate during pre-expansion and give moldings in which fusion of the particles is not impaired.

---

This invention relates to expandable plastics compositions in the form of fine particles which may be used for making molded articles. More specifically, the invention relates to plastics compositions based on styrene polymers which contain expanding agents and whose particles are coated with polymers.

It is known that molded articles of expanded styrene polymers are obtained when styrene polymers which are in the form of fine particles containing a gaseous or liquid expanding agent are heated in molds which are not gas-tight when closed to a temperature which is higher than the boiling point of the expanding agent and the softening point of the polymer. A method has particularly been adopted in industry in which the expandable particles containing expanding agent are first heated in a first stage until they have been expanded to a material having the desired bulk density. This process is known as pre-expansion. The pre-expanded particles are then further heated in a mold which is not gas-tight when closed so that they are completely expanded to form a molded article. This stage is known as post-expansion.

Expandable styrene polymers are generally pre-expanded in open or closed vessels by means of steam. The pre-expanded particles, particularly if they be heated to too high a temperature or for too long a period, may fuse into large agglomerates which must be broken up before they can be further processed because considerable difficulty is encountered in post-expanding agglomerates into molded articles; for example it is not possible to fill molds uniformly with agglomerates and to obtain moldings having homogeneous structure.

It is alreaty known that fusing of the particles during pre-expansion can be lessened by applying to the surface of the particles a small amount of wax or heavy-metal soaps, such as zinc stearate. It has been found however that in the production of molded articles from particles thus treated (i.e. in post-expansion) difficulty is also experienced because the particles fuse incompletely. Expanded molded articles thus obtained have only low mechanical strength and unfavorable insulation properties.

We have now found that expandable plastics compositions in the form of fine particles which contain a styrene polymer and an expanding agent do not have the above-mentioned disadvantages when the particles of a styrene polymer containing expanding agent are coated with 0.01 to 0.4% by weight (with reference to the styrene polymer) of another vinyl polymer or a vinylidene polymer by applying an aqueous dispersion of the vinyl or vinylidene polymer and evaporating the water.

Styrene polymers in accordance with this invention are defined as polystyrene and copolymers of styrene with other $\alpha,\beta$-unsaturated polymerizable compounds which contain at least 50% by weight of polymerized styrene units. Examples of copolymerization components are: $\alpha$-methylstyrene, nuclear halogenated styrenes, acrylonitrile, esters of acrylic or methacrylic acid with alcohols having one to eight carbon atoms, N-vinyl compounds, such as vinylcarbazole, or small amounts of compounds containing two polymerizable double bonds, such as butadiene, divinylbenzene or butanediol diacrylate.

Expanding agents which are contained in the styrene polymers may be hydrocarbons or organic halogen-carbon compounds which are gaseous or liquid under standard conditions, which do not dissolve the styrene polymer and whose boiling point is lower than the softening point of the polymer. Examples of suitable expanding agents are aliphatic hydrocrabons having two to six carbon atoms, such as ethylene, propane, butane, pentane, hexane, cyclohexane or organic halogen-carbon compounds having one to three carbon atoms, such as dichlorodifluoromethane and trifluorochloromethane. The expanding agent may be contained in the expandable compositions in amounts of from 2 to 20% by weight, preferably 3 to 10% by weight, with reference to the polymer.

Other components may be contained in the plastics compositions, for example flame retardants, such as tris-(dibromopropyl) phosphate or hexabromocyclododecane, or organic or inorganic fillers, dyes, antistatics or plasticizers.

The expandable plastics compositions may be in the form of beads, granulate or small lumps such as are obtained by grinding substance polymers. The finely divided compositions preferably have an average particle diameter of from 0.2 to 3 mm.

The finely divided styrene polymers containing expanding agent are prepared by conventional methods. For example finely divided styrene polymers containing expanding agent may be obtained by suspension polymerization of the monomers in the presence of expanding agents or by the action of expanding agents on styrene polymers in aqueous suspension.

Suitable other vinyl compounds within the scope of the invention are those which are not based on styrene. Examples are homopolymers and copolymers of vinyl esters, of acids having two to six carbon atoms, such as vinyl acetate and vinyl propionate, acrylic esters of alcohols having one to eight carbon atoms or vinyl chloride. Examples of suitable vinylidene polymers are vinylidene chloride copolymers for example with vinyl chloride, acrylonitrile, acrylic esters or vinyl esters. Vinyl acetate and vinyl propionate polymers, such as polyvinyl acetate, polyvinyl propionate or copolymers of vinyl acetate and maleic anhydride or maleic esters are particularly suitable.

The vinyl or vinylidene polymers are present in aqueous dispersion, the dispersions advantageously containing from 10 to 60% by weight of polymer. The dispersions may contain plasticizers. Only those compounds should be used as plasticizers, however, which do not impair the mechanical properties of the styrene polymers. For example esters of phthalic and adipic acid with alcohols having one to eighteen carbon atoms are suitable. It is preferable to use dispersions which form a coherent film on the surface of the beads at below 70° C., particularly below 50° C.

The dispersions are applied in such amounts to the finely divided styrene polymers that when the water has evaporated, an amount of 0.01 to 0.4%, advantageously 0.02 to 0.2%, by weight (with reference to the styrene polymer) of vinyl or vinylidene chloride polymer remains on the surface of the particles.

It is advantageous to apply the dispersions by simply mixing them with the finely divided styrene polymers containing expanding agent. It is also possible to spray the particles with the dispersions in a stirred container.

Evaporation of the water from the dispersions is advantageously carried out in the range from 20° to 50° C. It may be carried out advantageously by passing air or another indifferent gas over the coated particles. Temperatures of up to 95° C. may also be used in flash dryers having very short residence times.

It is a particular advantage of the plastics compositions according to this invention that they do not stick together during pre-expansion. The particles in the molded articles prepared from the pre-expanded particles are completely fused together.

The invention is further illustrated by the following examples.

Example 1

Samples of expandable polystyrene beads which contain 6% of pentane as expanding agent, whose particles have a diameter of from 0.4 to 2.3 mm., are coated with 0.05% (with reference to the styrene polymer) of vinyl polymers by applying the aqueous plastics dispersions 1 to 6 specified below. The water is then evaporated by passing air at 40° C. over the beads. For comparison, a sample of the abovementioned expandable polystyrene beads which has been coated with 0.02% of zinc stearate, and an uncoated sample, are pre-expanded.

The expandable polystyrene samples thus treated are spread out on a fine-meshed screen in a boxlike pre-expansion apparatus and pre-expanded for six minutes with flowing steam at 105° C. After this period, the polystyrene particles have expanded to sixty times their original volume and are stuck together to a greater or lesser extent.

The degree of adhesion of the particles is characterized by the following statement:

Degree of adhesion

0 = the particles lie side by side without the slightest adhesion.

1 = slight adhesion: the individual particles adhere to one another quite lightly but fall apart at the slightest pressure. If the pre-expanded material is stirred for a short time in a vessel, no agglomerates remain.

2 = moderate adhesion: individual particles adhere to each other rather more strongly. The agglomerates may be broken up by grinding and the individual particles are not damaged thereby.

3 = strong adhesion: the particles are stuck together strongly. The agglomerates may be broken up by grinding but a considerable proportion of the individual particles are thereby damaged.

The pre-expanded samples are then post-expanded and fused together in a pressure-proof perforated mold having the dimenisons 100 x 100 x 30 cm. under the action of steam at 0.8 atmosphere gauge for a period of ten seconds to form uniform expanded molded articles.

The degree of fusion of the individual particles is defined as the percentage proportion of the particles which are broken apart when the expanded molding is broken, in relation to the total number of particles in the fracture surface. Beads which have not fused together become detached along the particle interfaces.

The results are collated in the following Table 1: The polymer dispersions used are as follows:

(1) polyvinyl propionate in a 50% aqueous dispersion;
(2) polyvinyl propionate and 3% of dimethyl phthalate in a 50% aqueous dispersion;
(3) a copolymer of 90 parts of vinyl propionate and 10 parts of methyl acrylate in a 50% aqueous dispersion;
(4) polyvinyl acetate in a 50% aqueous dispersion;
(5) a copolymer of 90 parts of vinyl acetate and 10 parts of maleic anhydride in a 50% aqueous dispersion;
(6) polyisobutyl acrylate in a 50% aqueous dispersion;
(7) a copolymer of 3 parts of vinylidene chloride and 1 part vinyl chloride and 5% of dimethyl phthalate in a 40% aqueous dispersion.

In the table, C = amount of coating with reference to the styrene polymer:
A = degree of adhesion (as defined above) and
F = degree of fusion (as defined above).

TABLE 1

| Coating | C, percent | A | F, percent |
|---|---|---|---|
| Dispersion 1 | 0.05 | 0 | 100 |
| Dispersion 2 | 0.05 | 0 | 100 |
| Dispersion 3 | 0.05 | 0-1 | 95 |
| Dispersion 4 | 0.05 | 0-1 | 95 |
| Dispersion 5 | 0.05 | 0-1 | 95 |
| Dispersion 6 | 0.05 | 1 | 95 |
| Dispersion 7 | 0.05 | 1 | 90 |
| Zinc stearate | 0.02 | 1-2 | 75 |
|  |  | 2-3 | 95 |

Example 2

Samples of a bead composition containing a styrene polymer from 95 parts of styrene and 2 parts of acrylonitrile, as well as 3 parts of hexabromocyclododecane and 5.5 parts of pentane, and having a particle diameter of 0.8 to 1.6 mm. are coated with the dispersions specified in Example 1 or with zinc stearate. The results are shown in Table 2.

The samples are pre-expanded and then post-expanded to molded articles as described in Example 1. The results ascertained after pre-expansion and after post-expansion of the samples are given in Table 2:

TABLE 2

| Coating | C, percent | A | F, percent |
|---|---|---|---|
| Dispersion 1 | 0.05 | 0 | 90 |
| Dispersion 2 | 0.05 | 0 | 90 |
| Dispersion 3 | 0.05 | 0 | 85 |
| Dispersion 4 | 0.05 | 0-1 | 85 |
| Dispersion 5 | 0.05 | 0-1 | 85 |
| Dispersion 6 | 0.05 | 0-1 | 80 |
| Dispersion 7 | 0.05 | 0-1 | 75 |
| Zinc stearate | 0.02 | 1 | 50 |
| Do | 0.005 | 2 | 70 |
| Do | 0.03 | 1 | 40 |
|  |  | 2 | 80 |

Example 3

Expandable polystyrene beads having a particle diameter of 0.4 to 2.8 mm. and containing 6% by weight of pentane as expanding agent are coated with varying amounts of a 50% aqueous dispersion of polyvinyl propionate as described in Example 1. The samples are pre-expanded and processed into foam products as described in Example 1. The results found with the samples are given in Table 3:

TABLE 3

| Coating | C, percent | A | F, percent |
|---|---|---|---|
| Polyvinyl propionate in 50% aqueous dispersion. | 0.01 | 0-1 | 95 |
|  | 0.04 | 0 | 100 |
|  | 0.08 | 0 | 100 |
|  | 0.1 | 0 | 100 |
|  | 0.2 | 0 | 95 |
|  | 0.3 | 0 | 85 |
|  | 0.4 | 0 | 85 |
|  | 0.5 | 0 | 70 |
|  |  | 2-3 | 95 |

Example 4

Expandable bead compositions of polymers having the composition given below are coated with aqueous dispersions of certain polymers as described in Example 1 so that in each case 0.07% by weight of polymer adheres to the polymer particles containing expanding agent, the expanding agents used also being given below. The coated particles are pre-expanded and processed into foam products as described in Example 1. Results are given in Table 4.

POLYMERS

A: 95 parts of styrene and 5 parts of methyl methacrylate.
B: 70 parts of styrene and 30 parts of p-methylstyrene.
C: 80 parts of styrene and 20 parts of 2,5-dichlorostyrene.
D: 99 parts of styrene and 1 part of 2-ethylhexyl acrylate.
E: polystyrene.

EXPANDING AGENTS

F: 5.8 parts of hexane and 1.5 parts of dichlorodifluoromethane.
G: 6.8 parts of hexane.
H: 4 parts of butane and 0.2 part of methyl chloride.
I: 4 parts of butane and 0.5 part of propane.
J: 3 parts of pentane and 3 parts of trichlorotrifluoroethane.
K: 6 parts of pentane.

COATINGS

L: polyvinyl propionate.
M: copolymer of 50 parts of vinyl propionate and 50 parts of vinyl chloride.
N: polyvinyl acetate.
P: copolymer of 80 parts of vinylidene chloride and 20 parts of butyl acrylate.
Q: polyethyl acrylate.

TABLE 4

| Polymer | Expanding agent | Coating | Adhesion | Fusion, percent |
|---|---|---|---|---|
| A | F | L | 0 | 100 |
| B | G | M | 0 | 95 |
| C | H | N | 0-1 | 95 |
| D | I | P | 0 | 95 |
| E | J | P | 0 | 95 |
| E | K | Q | 0 | 95 |

We claim:

1. An expandable plastic material which comprises: discrete polymer particles, said polymer containing at least 50% by weight polymerized styrene units, said particles containing an expanding agent, said particles being coated with from 0.02 to 0.2% by weight with respect to said polymer of another polymer selected from the group consisting of homopolymers and copolymers of vinyl esters of carboxylic acids having two to six carbon atoms, acrylic acid esters of alcohols having one to eight carbon atoms, vinyl chloride and vinylidene chloride.

2. An expandable plastics composition as claimed in claim 1 wherein said other polymer is polyvinyl propionate.

3. An expandable plastics composition as claimed in claim 1 wherein said other polymer is polyvinyl acetate.

4. An expandable plastics composition as claimed in claim 1 wherein said styrene polymer is polystyrene.

5. An expandable plastics composition as claimed in claim 1 wherein said expanding agent is a compound selected from the group consisting of aliphatic hydrocarbons having two to six carbon atoms and organic halocarbons having one to three carbon atoms.

6. In a process for producing expandable discrete polymer particles, said polymer containing at least 50% by weight polymerized styrene units and containing an expanding agent, the improvement which comprises: applying to said polymer particles an aqueous dispersion of a polymer selected from the group consisting of homopolymers and copolymers of vinyl esters of carboxylic esters having two to six carbon atoms, acrylic acid acids of alcohols having one to eight carbon atoms, vinyl chloride and vinylidene chloride, the amount of coating polymer being from 0.02 to 0.2% by weight with respect to said polymer particles, and driving off said water to form coated particles.

7. A process as in claim 6 wherein said polymer dispersion is an aqueous polyvinyl propionate dispersion.

8. A process as in claim 6 wherein said polymer dispersion is an aqueous polyvinyl acetate dispersion.

9. A process as in claim 6 wherein said polymer dispersion is an aqueous polystyrene dispersion.

References Cited

UNITED STATES PATENTS 2,797,201 6/1957 Veatch et al.
3,086,885 4/1963 Jahn.
3,088,925 5/1963 Hall et al.
3,154,604 10/1964 McMillan.

SAMUEL H. BLECH, *Primary Examiner.*

JOHN C. BLEUTGE, *Assistant Examiner.*

U.S. Cl. X.R.

260—33.6, 41; 117—100, 161

PO-1050
(5/69)

UNITED STATES PATENT OFFICE
CERTIFICATE OF CORRECTION

Patent No. 3,428,579           Dated February 18, 1969

Inventor(s) Erhard Stahnecker et al

It is certified that error appears in the above-identified patent and that said Letters Patent are hereby corrected as shown below:

Column 6, line 20, "acids" should read -- esters --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents